Patented Nov. 22, 1949

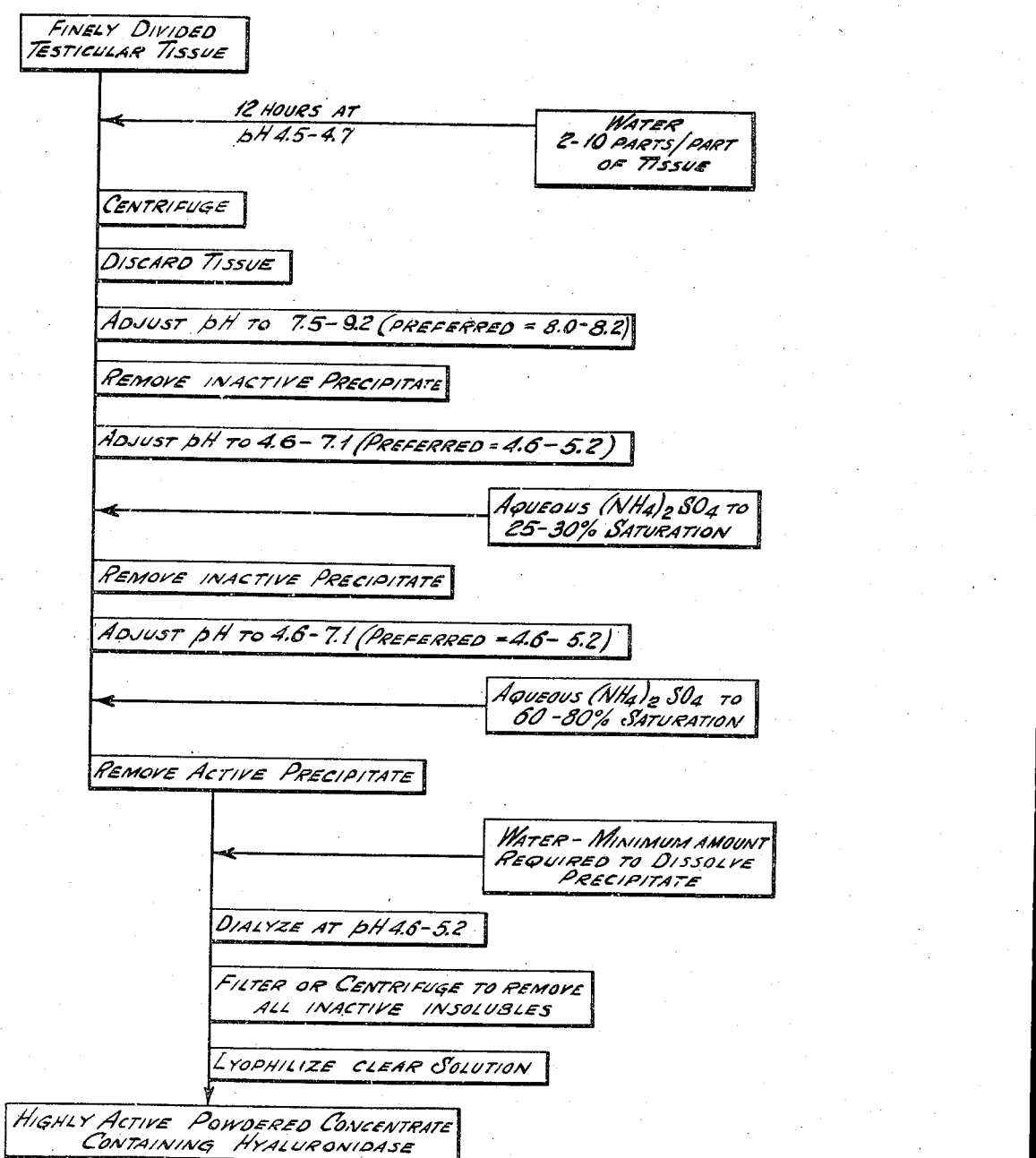

2,488,565

UNITED STATES PATENT OFFICE 2,488,565

PREPARATION OF HYALURONIDASE

Heron O. Singher, Redhook, and Helen Styles, New York, N. Y., assignors to Ortho Pharmaceutical Corporation, a corporation of New Jersey Application June 4, 1947, Serial No. 752,554

6 Claims. (Cl. 195—66)

This invention relates to the isolation and preparation of an enzyme which reduces the viscosity of mucopolysaccharides and more specifically relates to the isolation and preparation of hyaluronidase.

It has been known for a number of years that bacterial enzymes could reduce the viscosity of mucopolysaccharides, and an enzyme has been isolated from pneumococcus which hydrolyzes hyaluronic acid. More recently it has been shown that an enzyme which was capable of reducing the viscosity of synovial fluid could be isolated from mammalian testicular tissue, and it was concluded from this that the tissue contained an enzyme which depolymerized the hyaluronic acid which is present in synovial fluid. It was later demonstrated that purified hyaluronic acid was depolymerized by the action of this testicular enzyme. Various types of decomposition products have been identified including monosaccharides such as glucuronic acid and N-acetylglucosamine as well as oligosaccharides of varying molecular weights; however, the decomposition products obtained depended upon the purity of the enzyme.

The testicular enzyme which reduces the viscosity of hyaluronic acid by depolymerization is known as hyaluronidase; it is also known as the "spreading factor" because of the property it has of enhancing the diffusion in tissues by modifying the permeability of tissue in vivo.

Hyaluronidase has been found in relatively large amounts in mammalian testicular tissue, its most important source; it has also been found in sperm, spleen, and in certain bacteria and poisonous animals.

The theory has been advanced that the function of hyaluronidase in testicular tissue is connected with fertilization, and recent experiments suggest that this enzyme functions to accomplish the dissolution of the intracellular cement connecting the cells to the ova. The anesthetic effects of Novocain have been found to be enhanced by the addition of hyaluronidase to the Novocain which is injected; furthermore, drugs injected into the peritoneum together with hyaluronidase result in an increased absorption. These results indicate that hyaluronidase has many practical applications in the administration of pharmacological preparations by injection, since it has been shown that the effects of such preparations are enhanced as a result of increased absorption due to the presence of hyaluronidase.

Mammalian testicular tissue has generally been used as a source of hyaluronidase in laboratory preparations because of its availability and its relatively large content of the enzyme. One method used in the isolation and preparation of hyaluronidase has involved the extraction of finely divided testicular tissue with water, followed by an adjustment of the pH to 4.5 or by an extraction of the said tissue with 0.1 normal acetic acid and a subsequent removal of the issue, neutralization, and filtration. Another method used consists of water extraction and ammonium sulphate fractionation; inactive material was removed in the fraction precipitated at 27–30 per cent concentration of ammonium sulphate and active material was precipitated at 70 per cent concentration of ammonium sulphate. Lead acetate fractionation of a water extract of testicular tissue has been attempted with unsatisfactory results. Sodium chloride fractionation of the water extract yielded materials of such low activity that this method was unsatisfactory. All the methods of isolation and preparation of hyaluronidase from testicular tissue which have been developed so far have not been commercially feasible because hyaluronidase prepared by these methods was low in activity and the activity varied widely. The preparations produced by the methods of the prior art have contained large amounts of inactive material and variable amounts of insoluble material.

A general object of this invention is to isolate and prepare hyaluronidase from mammalian testicular tissue by a method which results in a product having high activity and containing a minimum of inactive materials.

Another and more specific object of this invention is to prepare hyaluronidase from testicular tissue, at a temperature substantially below normal temperatures, and to purify the crude enzyme by alcohol fractionation.

Other objects will be apparent from the following description and appended claims.

The objects of this invention are accomplished by extracting finely divided mammalian testicular tissue with water and by a subsequent purification and fractionation of the aqueous extract which results in the isolation of a highly active hyaluronidase preparation. The whole process of extraction, purification, and fractionation is performed at a temperature below 5° C.

Testicular tissue is finely divided by freezing testes from which the membranous covering has been removed. The frozen testes are broken into small pieces and ground into a very fine powder and then subjected to further subdivision by means of a Waring blender. The resulting viscous material is diluted with water. Two to ten parts of water may be used for each part of testicular material, but it is preferred to employ five parts of water for each part of tissue. When the dilution is less than two parts of water to one of tissue, complete extraction is not accomplished; and when the dilution is greater than ten parts of water to one of tissue, the amount of enzyme extracted is relatively constant and only diluted by the greater volume of water. The pH of the aqueous solution is adjusted and maintained at 4.5–4.7 during the extraction. If the pH is higher than 4.7, the yield of enzyme is lower; and if the pH is lower than 4.5, there is some destruction of the activity of the enzyme. The extraction is continued over a period of at least 12 hours with constant slow stirring. The residual tissue is removed by any satisfactory means, such as centrifugation, and may then be re-extracted with water and again the pH during the re-extraction is maintained at 4.5–4.7. The pH of the aqueous extract or the combined aqueous extracts is adjusted to 7.5–9.2, the preferred being from 8.0–8.2; the extract is then allowed to stand for several hours and during this time an inactive precipitate is formed. The precipitate is removed, and the clear solution is adjusted so that the pH is 4.6–7.1; the preferred pH is 4.6–5.2. Ammonium sulphate is added in an amount such that the solution is 25–30 per cent saturated with respect thereto, and during the addition of the ammonium sulphate the pH is carefully controlled so that it is at all times within the above range. It is of distinct advantage to add the ammonium sulphate to the solution by dialysis, since in this case dialysis of a salt into the protein solution reduces denaturation of the protein to a minimum. The solution containing ammonium sulphate forms a precipitate on standing, and this essentially inactive precipitate is removed by filtration or centrifugation. The pH of the clear solution is again adjusted to from 4.6–7.1 and is preferably adjusted to 4.6–5.2. Ammonium sulphate is again added to the solution in an amount sufficient to bring the concentration of ammonium sulphate up to 60–80 per cent of saturation with respect thereto, and during this second addition of ammonium sulphate the pH is carefully controlled and kept within the above range. It is of advantage here also to add ammonium sulphate by dialysis. A precipitate is formed as a result of the second addition of ammonium sulphate, and this precipitate contains the enzyme, hyaluronidase. The precipitate is redissolved in a minimal amount of water, and this solution is dialyzed against running water; and during this dialysis the pH of the solution is kept at 4.6–5.2 which is the preferred range, although a pH of 4.6–7.1 may be used, until the solution is essentially free from sulphate ion. As ammonium sulphate is removed by dialysis, the water soluble enzyme goes into solution but a certain amount of insoluble and essentially inactive material remains, and after the solution is free from sulphate ion, it is filtered or centrifuged to remove inactive insoluble material. The clear solution remaining is dried in any appropriate manner in which the temperature is maintained at least as low as possible and should not be allowed to rise above ordinary temperatures; an effective means of drying this residual fluid is by lyophilization. The hyaluronidase obtained by this procedure can be refractionated by any satisfactory procedure such as alcohol fractionation or by dissolving it in water and adding ammonium sulphate to 25–30 per cent of saturation to precipitate inactive material, and by a second addition of ammonium sulphate to 60–80 per cent of saturation to precipitate hyaluronidase. The refractionation must be made at a pH of 4.6–7.1 and preferably at a pH of 4.6–5.2.

This method results in a minimum amount of denaturation of the enzyme and yields a product of high purity and high activity.

The following example is given to illustrate a specific embodiment of the invention, but it is not intended that the scope of the invention be delineated thereby, but is to be limited only by the breadth of the appended claims.

*Example*

The temperature throughout the following procedure is kept at all times within the range of from 1° to 5° C.

2156 grams of bull testes, which had been frozen solid in a low-temperature cabinet, were divested of their outer membranous coats by being momentarily dipped in hot water, followed by an incising of the coverings and peeling of the coverings from the testicular tissue. The weight of the testes from which the membranous coats had been removed was 1990.5 grams, and this frozen material was broken into small pieces and ground into a very fine powder in close contact with finely ground "Dry" Ice. The finely ground material was allowed to come to room temperature, and the semi-solid tissue mass was treated in a Waring blender until it was a fairly homogeneous viscous mass.

The viscous mass of testicular tissue was stirred into 10 liters of water by means of a mechanical stirrer, and glacial acetic acid was added dropwise until the pH was 4.64; this required 8.5 ml. of acid. The tissue-water mixture was placed in a cold room in which the temperature was below 5° C., and above 1° C. and allowed to stand for 42 hours. During this time the pH was periodically determined, and it was found that the pH did not change. The mixture was centrifuged, and the precipitate was discarded. The supernatant liquid was adjusted to a pH of 8.64 by the addition of 5 normal sodium hydroxide solution while the solution was being vigorously stirred. A precipitate was formed when this solution was allowed to stand, and the precipitate was removed by centrifugation. The pH of the supernatant liquid was adjusted to 6.0 with acetic acid, and an inactive precipitate which was formed on standing was removed by centrifugation. The supernatant, which had a volume of 10 liters, was divided into two equal portions of 5 liters each. The pH of one of the portions was adjusted with 2 normal acetic acid to 4.64; this required 54 ml. of the acid. 985.45 grams of ammonium sulphate was dialyzed into this aqueous extract. The solution had a specific gravity of 1.070, which is the specific gravity of water which is approximately 25 per cent saturated with ammonium sulphate. The ammonium sulphate solution was centrifuged to remove inactive precipitate, and 1400 grams of ammonium sulphate was dialyzed into the supernatant liquid. This solution was allowed to stand with stirring for four days and at that time its specific gravity was 1.180 which is the specific gravity of water which is approximately 70 per cent saturated with ammonium sulphate. The 70 per cent saturated solution was centrifuged and the supernatant liquid was discarded. The precipitate was dissolved in 200 cc. of water, and this solution was dialyzed against running water which had been cooled to 1° to 5° C., and the dialysis was continued until no more sulphate ion was present in the solution. The dialyzed material was centrifuged, and the precipitate was discarded. The supernatant liquid was lyophilized, and 3 grams of solid material which was freely soluble in water was obtained.

The dried material was tested for activity according to the procedure of Madinaveitia and Quibell, Biochemical Journal, volume 34, page 625 (1940), and volume 35, page 456 (1941), and 1 mg. was found to contain approximately 6 reducing units. One reducing unit is represented by a preparation of which 1 mg. will reduce the viscosity of hyaluronic acid to one half its initial viscosity in twenty minutes.

What is claimed is:

1. A process for the preparation of hyaluronidase from finely divided testicular tissue, conducted throughout at a temperature within the range of from 1° to 5° C., which comprises adding water to said tissue, adjusting the pH of the aqueous mixture to within the range of from 4.5–5.7, separating the solid material from the liquid, adjusting the pH of the liquid to within the range of from 7.5–9.2, whereby inactive solid material is precipitated, separating the precipitate from the liquid, adjusting the pH of the liquid to within the range of from 4.6–7.1, adding ammonium sulphate to the liquid in an amount such that the liquid is 25–30 per cent saturated, whereby inactive solid material is precipitated, separating the precipitate from the liquid, adjusting the pH of the liquid to a point within the range of from 4.6–7.1, adding ammonium sulphate to the liquid in an amount such that the liquid is 60–80 per cent saturated with ammonium sulphate, whereby hyaluronidase is precipitated from the solution, and separating the precipitate from the liquid.

2. A process for the preparation of hyaluronidase from finely divided testicular tissue, conducted throughout at a temperature within the range of from 1° to 5° C., which comprises adding water to said tissue, adjusting the pH of the aqueous mixture to within the range of from 4.5–5.7, separating the solid material from the liquid, adjusting the pH of the liquid to within the range of from 7.5–9.2, whereby inactive solid material is precipitated, separating the precipitate from the liquid, adjusting the pH of the liquid to within the range of from 4.6–7.1, adding ammonium sulphate to the liquid in an amount such that the liquid is 25–30 per cent saturated, whereby inactive solid material is precipitated, separating the precipitate from the liquid, adjusting the pH of the liquid to a point within the range of from 4.6–7.1, adding ammonium sulphate to the liquid in an amount such that the liquid is 60–80 per cent saturated with ammonium sulphate, whereby hyaluronidase is precipitated from the liquid, separating the precipitate from the liquid, dissolving the precipitate in water, and dialyzing the aqueous solution against running water.

3. A process for the preparation of hyaluronidase from finely divided testicular tissue, conducted throughout at a temperature within the range of from 1° to 5° C., which comprises adding water to said tissue, adjusting the pH of the aqueous mixture to within the range of from 4.5–5.7, separating the solid material from the liquid, adjusting the pH of the liquid to within the range of from 7.5–9.2, whereby inactive solid material is precipitated, separating the precipitate from the liquid, adjusting the pH of the liquid to within the range of from 4.6–7.1, adding ammonium sulphate to the liquid in an amount such that the liquid is 25–30 per cent saturated, whereby inactive solid material is precipitated, separating the precipitate from the liquid, adjusting the pH of the liquid to a point within the range of from 4.6–7.1, adding ammonium sulphate to the liquid in an amount such that the liquid is 60–80 per cent saturated with ammonium sulphate, whereby hyaluronidase is precipitated from the solution, separating the precipitate from the liquid, dissolving the precipitate in water, dialyzing the aqueous solution against running water, and filtering.

4. A process for the preparation of hyaluronidase from finely divided testicular tissue, conducted throughout at a temperature within the range of from 1° to 5° C., which comprises adding water to said tissue, adjusting the pH of the aqueous mixture to within the range of from 4.5–5.7, separating the solid material from the liquid, adjusting the pH of the liquid to within the range of from 8.2–8.3, whereby inactive solid material is precipitated, separating the precipitate from the liquid, adjusting the pH of the liquid to within the range of from 4.6–5.2, adding ammonium sulphate to the liquid in an amount such that the liquid is 25–30 per cent saturated, whereby inactive solid material is precipitated, separating the precipitate from the liquid, adjusting the pH of the liquid to a point within the range of from 4.6–5.2, adding ammonium sulphate to the liquid in an amount such that the liquid is 60–80 per cent saturated with ammonium sulphate, whereby hyaluronidase is precipitated from the solution, and separating the precipitate from the liquid.

5. A process for the preparation of hyaluronidase from finely divided testicular tissue, conducted throughout at a temperature within the range of from 1° to 5° C., which comprises adding water to said tissue, adjusting the pH of the aqueous mixture to 4.6, separating the solid material from the liquid, adjusting the pH of the liquid to within the range of from 8.2–8.3, whereby inactive solid material is precipitated, separating the precipitate from the liquid, adjusting the pH of the liquid to within the range of from 4.6–5.2, adding ammonium sulphate to the liquid in an amount such that the liquid is 25–30 per cent saturated, whereby inactive solid material is precipitated, separating the precipitate from the liquid, adjusting the pH of the liquid to a point within the range of from 4.6–7.1, adding ammonium sulphate to the liquid in an amount such that the liquid is 60–80 per cent saturated with ammonium sulphate, whereby hyaluronidase is precipitated from the solution, and separating the precipitate from the liquid.

6. A process for the preparation of hyaluronidase from finely divided testicular tissue, conducted throughout at a temperature within the range of from 1° to 5° C., which comprises adding water to said tissue, adjusting the pH of the aqueous mixture to within the range of from 4.5–5.7, separating the solid material from the liquid, adjusting the pH of the liquid to within the range of from 7.5–9.2, whereby inactive solid material is precipitated, separating the precipitate from the liquid, adjusting the pH of the liquid to within the range of from 4.6–7.1, adding ammonium sulphate to the liquid in an amount such that the liquid is 25–30 per cent saturated, whereby inactive solid material is precipitated, separating the precipitate from the liquid, adjusting the pH of the liquid to a point within the range of from 4.6–7.1, adding ammonium sulphate to the liquid in an amount such that the liquid is 60–80 per cent saturated with ammonium sulfate, whereby hyaluronidase is precipitated from the solution, separating the precipitate from the liquid, dissolving the precipitate in water, dialyzing the aqueous solution against running water, filtering the aqueous solution, and evaporating the aqueous solution to dryness.

HERON O. SINGHER.
HELEN STYLES.

REFERENCES CITED

The following references are of record in the file of this patent:

Jour. Soc. of Chem. Ind. (London), 1932, vol. 51, page 912, by Morgan and McClean.